Oct. 20, 1959  A. L. CATALINE ET AL  2,909,232
DRIVE MECHANISM FOR SELF-PROPELLED LAWN MOWERS
Filed April 11, 1956  4 Sheets-Sheet 1

INVENTORS
ACIAL L. CATALINE & GILBERT E. BUSKE
BY
ATTORNEYS.

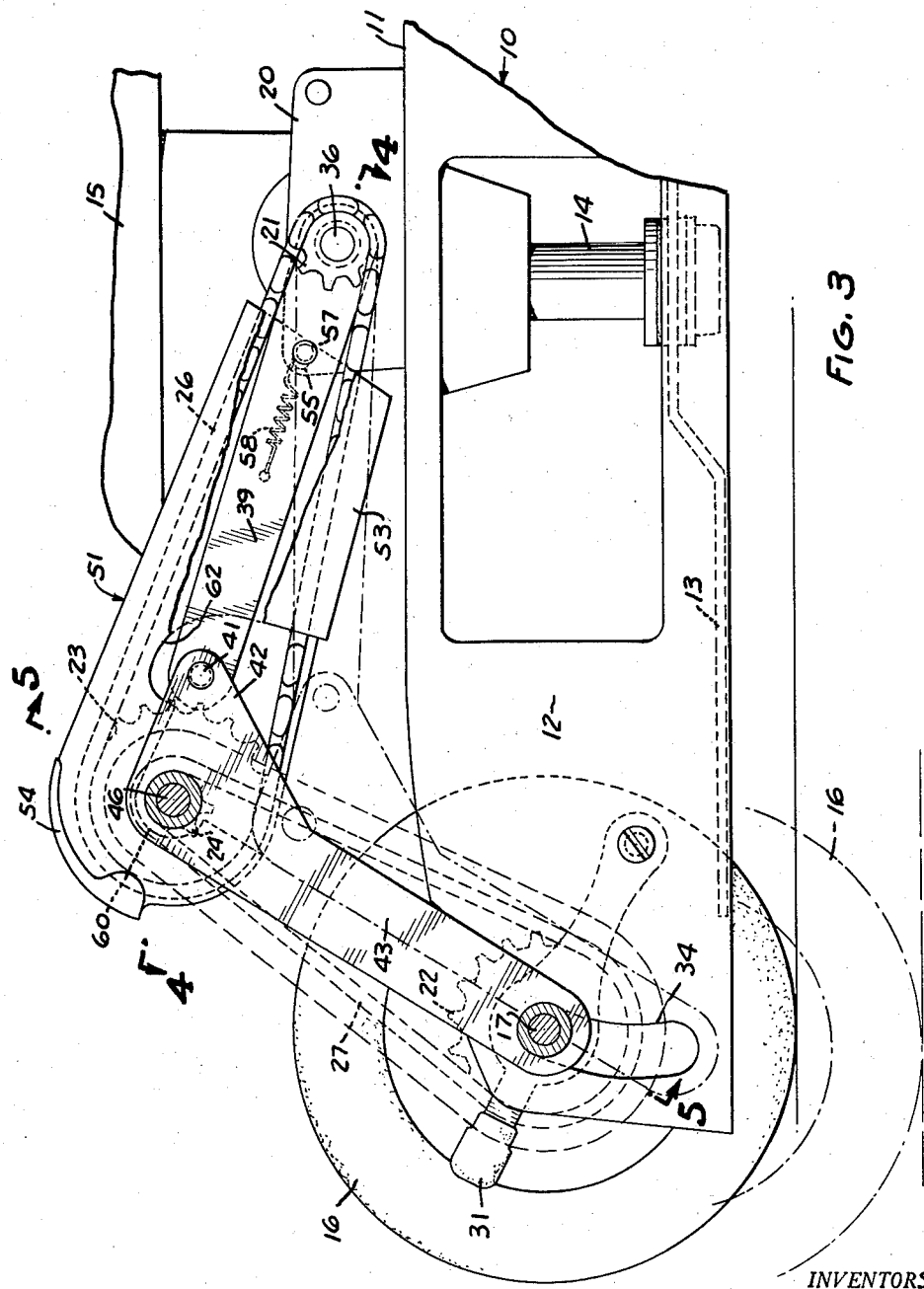

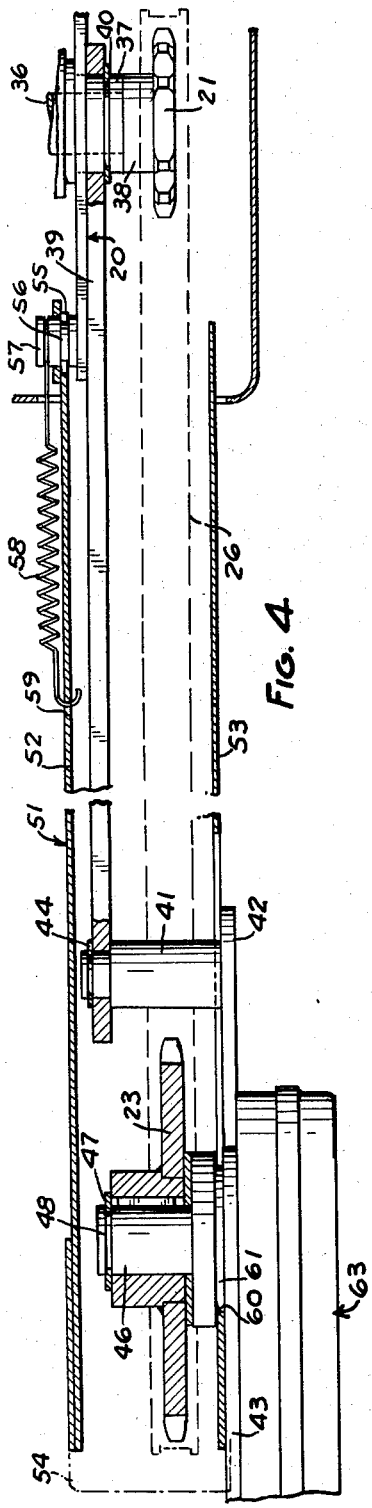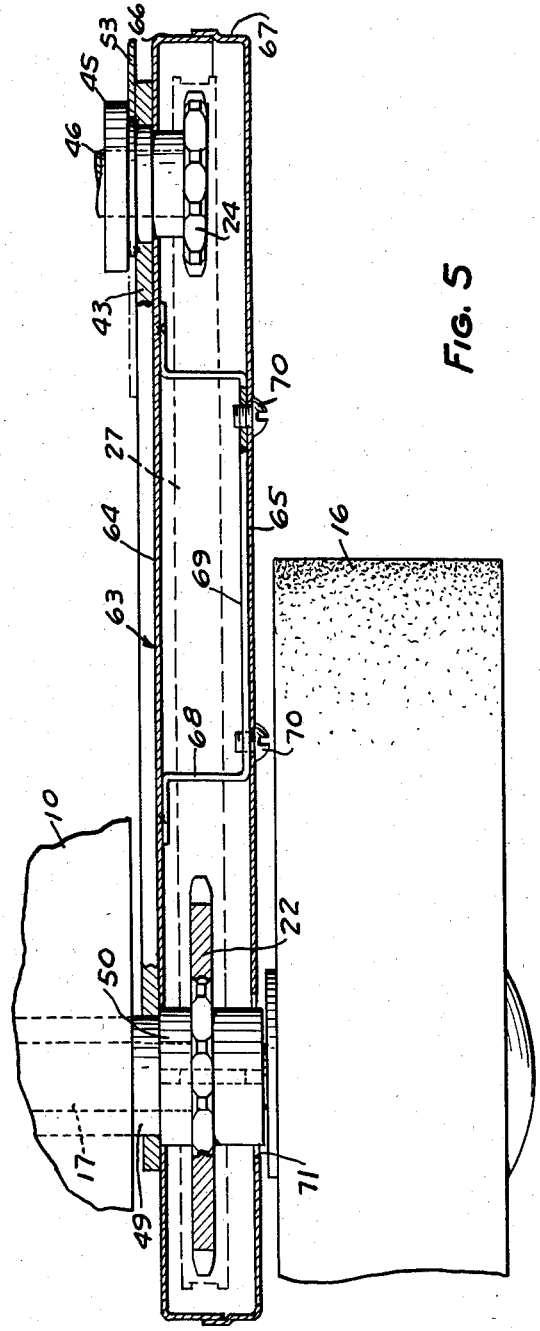

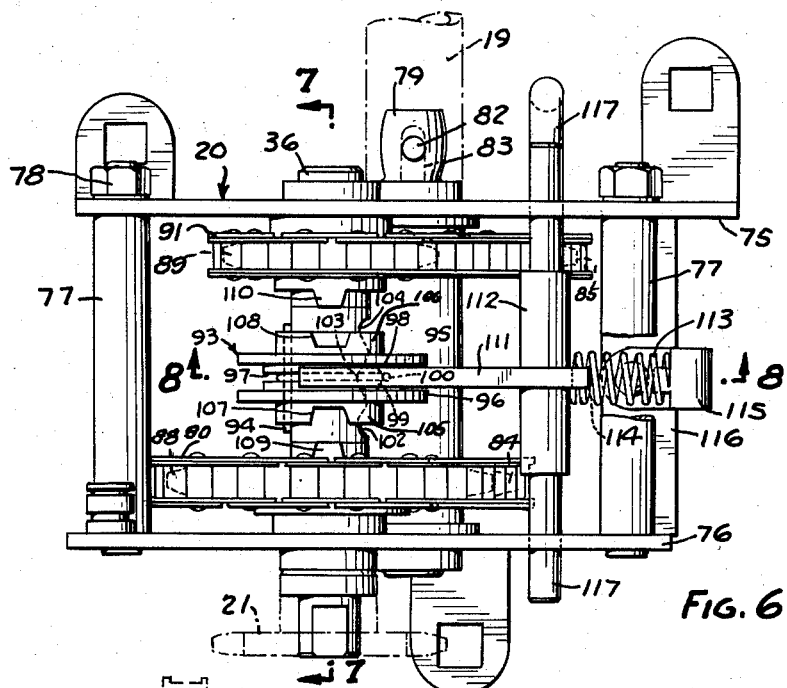

United States Patent Office 2,909,232
Patented Oct. 20, 1959

2,909,232
DRIVE MECHANISM FOR SELF-PROPELLED LAWN MOWERS

Acial L. Cataline and Gilbert E. Buske, Lansing, Mich., assignors to Motor Wheel Corporation, Lansing, Mich., a corporation of Michigan Application April 11, 1956, Serial No. 577,506

2 Claims. (Cl. 180—19)

This invention relates to self-propelled lawn mowers and particularly to a drive mechanism for self-propelled lawn mowers of the rotary type.

Rotary type lawn mowers generally comprise a housing in which a rotary blade is mounted for rotation about a vertical axis. In one type of such mowers the cutting height of the mower is adjusted by changing the relative position of the wheels to the housing. The power for propelling the mower along the ground is transmitted from a power unit such as an electric motor or an internal combustion engine to the wheels by a suitable drive mechanism.

When the position of the wheels relative to the housing is changed in order to change the height of grass cut, the drive mechanism must also be adjusted to compensate for the change in position of the wheels relative to the housing. In addition, in some types of self-propelled rotary mowers, the drive from the power unit to the wheels is positioned at least partially within the housing and an opening is sometimes made in the housing to accommodate the drive mechanism. Since, in more recent investigations, it has been determined that such obstructions and openings in the housing impair the efficiency of the cutting operation of rotary lawn mowers, such obstructions and openings are not desirable.

It is therefore an object of this invention to provide a drive mechanism for a self-propelled rotary mower in which no adjustment of the mechanism is required when the position of the wheels relative to the housing is changed.

It is a further object of this invention to provide such a drive mechanism which is completely outside the housing and does not require any openings in the housing.

It is a further object of this invention to provide such a drive mechanism in which the moving parts move at fairly low speed so that frequent lubrication is not required.

In the drawings:

Fig. 3 is a fragmentary side elevational view, on an enlarged scale, parts being broken away.

Fig. 4 is a fragmentary part sectional view on an enlarged scale taken along the line 4—4 in Fig. 3.

Fig. 5 is a fragmentary part sectional view taken along the line 5—5 in Fig. 3.

Fig. 6 is a plan view of the transmission, on an enlarged scale.

Fig. 7 is a sectional view taken along the line 7—7 in Fig. 6.

Fig. 8 is a sectional view taken along the line 8—8 in Fig. 6, on a reduced scale.

Figure 1:
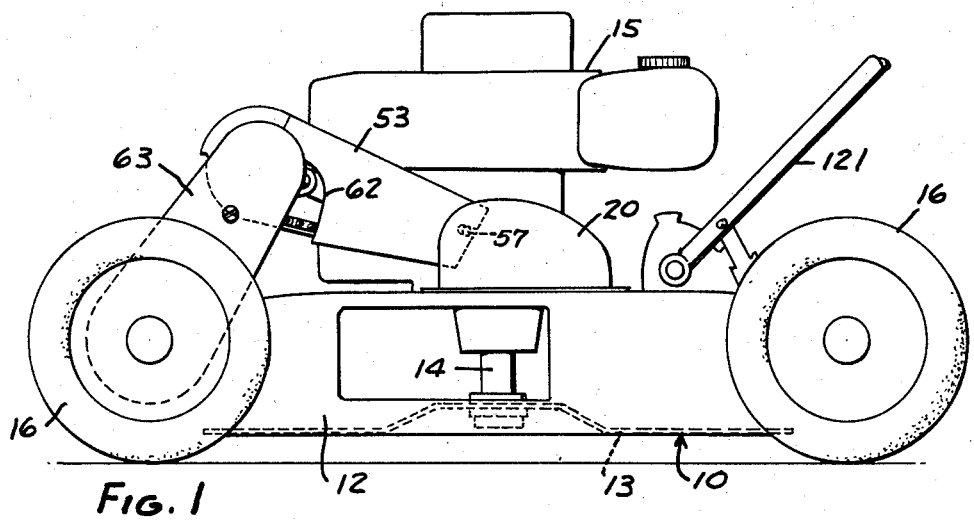
Fig. 1 is a side elevational view of the lawn mower embodying the invention.

Referring to Fig. 1, the lawn mower comprises a housing 10 including a generally flat top wall 11 and a peripheral skirt 12. A rotary blade 13 is mounted for rotation about a vertical axis on a shaft 14 which is driven by a power unit 15 herein shown as an internal combustion engine. Wheels 16 are fastened on axles 17, 18 which, in turn, are vertically adjustable relative to housing 10. Axle 17 is driven by engine 15 to propel the mower along the ground.

Figure 2:
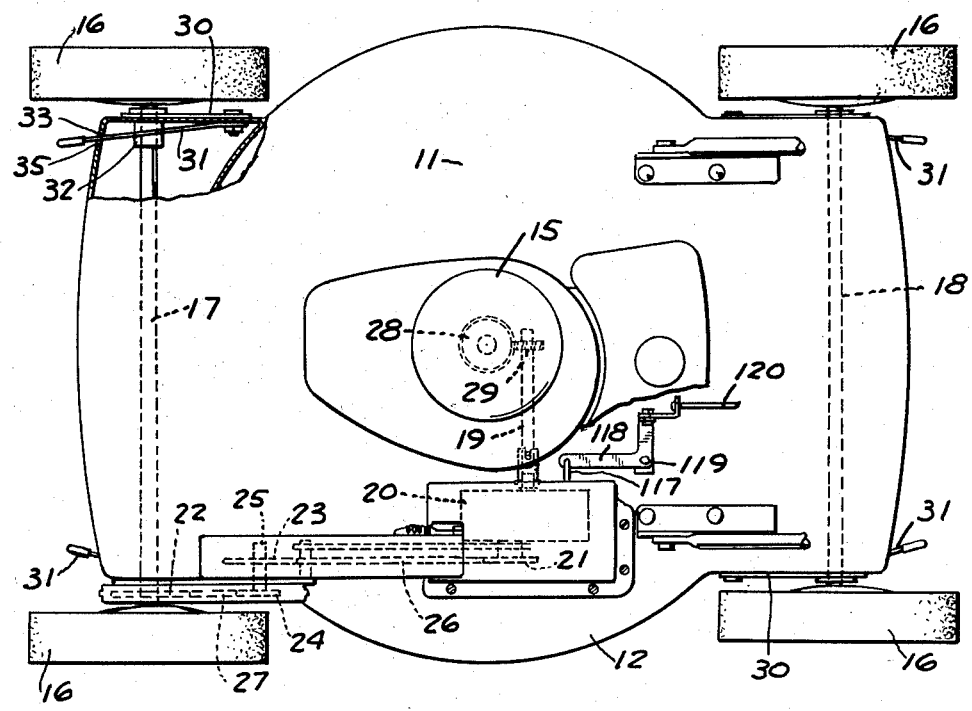
Fig. 2 is a plan view of the same, parts being broken away.

As shown in Fig. 2, the drive to axle 17 includes a take-off shaft 19 driven by engine 15 and projecting laterally from the side of the engine, a transmission 20 driven by the take-off shaft 19, a sprocket 21 driven by transmission 20, a sprocket 22 mounted on the axle 17 and intermediate sprockets 23, 24 mounted on a jack shaft 25 in movable relationship relative to sprockets 21 and 22, as presently described. An endless chain 26 is trained over sprockets 21 and 23, and an endless chain 27 is trained between sprockets 22 and 24 to complete the drive mechanism.

Take-off shaft 19 projects outwardly from the crankcase of engine 15 above top wall 11 of lawn mower housing 10. Take-off shaft 19 is rotated by a worm 28 which drives a worm gear 29 on take-off shaft 19 within the crankcase. Such a power take-off mechanism is shown in the copending application of Gilbert E. Buske and Russell L. Morden, titled Power Take-Off for Lawn Mowers, Serial No. 567,826, filed February 27, 1956, and which is assigned to the assignee of the instant application. In such a power take-off, shaft 19 is rotated at a relatively low speed, since the major portion of the speed reduction takes place in the crankcase of the engine.

The position of axles 17, 18 and, in turn, the position of the wheels relative to housing 10 may be adjusted by any suitable mechanism. As shown in Figs. 2 and 3, a pair of arms 30, 31 are pivoted on the side wall of skirt 12 at each end of the axles 17, 18; and a hub 32 is mounted in outer arm 30 with axle 17 rotatably mounted in the hub. Inner arm 31 is made of a spring material so that it has limited movement laterally of housing 10. The end of inner arm 31 projects outwardly through a vertical slot 33 in the end of housing 10. Arcuate slots 34 are provided in the side wall of skirt 12 so that the axles are movable vertically in slots 34. The position of the axles relative to the housing may be adjusted by moving spring arm 31 up or down relative to the housing. Notches 35 are provided along one edge of slot 33 so that spring arm 31 may selectively engage any one of the notches to establish the position of the axle relative to the housing.

As further shown in Fig. 2, such a wheel height adjustment is provided at each end of each axle. This wheel height adjustment is more completely described in the copending application of Acial L. Cataline, titled Wheel Adjustment for Lawn Mowers, Serial No. 567,764, filed February 27, 1956, which has since issued as Patent No. 2,818,270 and which is assigned to the assignee of the instant application.

Referring to Figs. 3, 4 and 5, sprocket 21 is keyed to output shaft 36 of transmission 20. A collar 37 is rotatably mounted on output shaft 36 between the outer wall of transmission 20 and hub portion 38 of sprocket 21. A link 39 has one end thereof rotatably mounted on collar 37 and is held in axial position relative to collar 37 by a split ring 40. The other end of link 39 is rotatably mounted on the reduced end of a pin 41 fixed on dog leg portion 42 of a driving arm 43. A split ring 44 maintains the end of link 39 on pin 41.

As shown in Figs. 3 and 5, driving arm 43 has a hub 45 welded to the upper end thereof in which a jack shaft 46 is rotatably mounted. Sprocket 23 is keyed to jack shaft 46 on the inside of driving arm 43 while sprocket 24 is mounted on jack shaft 46 on the outside of arm 43. A split ring 47 engages a groove 48 in the end of jack shaft 46 to maintain sprocket 23 in proper axial relationship on jack shaft 46. Sprocket 22 is keyed to axle 17 (Fig. 5) and the lower end of driving arm 43 is pivoted on a reduced portion 49 of hub 50 of sprocket 22, between housing 10 and sprocket 22.

A chain housing or guard 51 is provided for the inner chain 26 which extends between sprockets 21 and 23. As shown in Figs. 1, 2, 3 and 4, guard 51 includes spaced parallel walls 52, 53 and an arcuate end cap 54. Inner wall 52 of guard 51 is provided at the end thereof opposite end cap 54 with a slot 55 which engages annular groove 56 on a pin 57 mounted on the housing of transmission 20. A tension spring 58 has one end thereof hooked to pin 57 and the other end thereof engaging an opening 59 in inner wall 52 so that guard 51 is urged toward pin 57. Outer wall 53 of guard 51 has a portion thereof cut away as shown at 62 to prevent interference of guard 51 with the movement of the end of link 39 and pin 41. Portion 62 extends forwardly of pin 41 and is fashioned with a semi-circular edge 60 which is adapted to engage a reduced portion 61 of hub 45 adjacent driving arm 43 (Figs. 4, 5).

As shown in Figs. 1, 2, 3 and 5, a chain housing or guard 63 is provided for outer chain 27. Guard 63 includes spaced parallel walls 64, 65 having overlapping peripheral rims 66, 67, respectively. Inner wall 64 is welded or otherwise fixed to driving arm 43 while outer wall 65 is mounted on the inner wall by engagement with a U-shaped bracket 68. The U-shaped bracket 68 is welded to the surface of wall 64 and has the bight portion 69 thereof projecting outwardly into contact with outer wall 65. Screws 70 extend through outer wall 65 and are threaded into the bight portion 69 of U-shaped bracket 68. Outer wall 65 of guard 63 is provided with an opening 71 of larger diameter than hub 50 and coaxial with hub 50 so that outer wall 65 does not interfere with rotation of hub 50 and sprocket 22.

Transmission 20 is shown on an enlarged scale in Figs. 6, 7 and 8. As shown in Fig. 6, the housing of the transmission comprises spaced plates 75, 76 which are maintained in parallel relationship by spacers 77. Spacers 77 have one end thereof fixed, for example, by staking, to place 76. The other end of spacer 77 is threaded and passes through plate 75, and a nut 78 is threaded thereon.

As shown in Fig. 7, input shaft 79 is journalled in bearings 80, 81 in plates 76, 75, respectively. One end of input shaft 79 projects outwardly and has a transverse pin 82 therein adapted to engage slotted coupling 83 connected to take-off shaft 19 from the engine (Fig. 6). A small sprocket 84 and a large sprocket 85 are keyed to input shaft 79. Output shaft 36 is journalled in bearings 86, 87 in plates 76, 75, respectively. A large sprocket 88 and a small sprocket 89 are rotatably mounted on output shaft 36. An endless chain 90 is trained over small sprocket 84 on input shaft 79 and large sprocket 88 on output shaft 36. Another endless chain 91 is trained over large sprocket 85 on input shaft 79 and small sprocket 89 on output shaft 36.

Central portion 92 of output shaft 36 is of larger diameter; and a collar 93 is keyed to central portion 92 by a key 94 in such a manner that collar 93 is rotatable with output shaft 36 but may be shifted axially thereon. Collar 93 includes spaced flanges 95, 96 and an annular groove 97 between flanges 95, 96. In addition, collar 93 is provided with a radial opening 98 extending to output shaft 36. A hardened steel ball 99 is positioned in opening 98 and is held in contact with output shaft 36 by a spring 100 which has one end thereof engaging an opening 101 in the base of groove 97 and the other end thereof looped around the base of the groove and over the outer surface of ball 99 to maintain the ball in position (Fig. 8).

Output shaft 36 is provided with three flat bottomed depressions 102, 103 and 104 adjacent ball 99. Depressions 102, 103 and 104 have sloping sides. By shifting collar 93 axially relative to output shaft 36, ball 99 is moved from one depression to another.

Collar 93 is provided with axial extensions 105, 106 which have diametrically opposed slots or jaws 107, 108, respectively, extending radially thereof and adapted to engage projections or teeth 109, 110 on the hubs of sprockets 88, 89, respectively. The sides of slots 107, 108 are tapered as are the sides of projections 109, 110, the width of slots 107, 108 being greater than the width of projections 109, 110 in order that the slots may readily engage the projections when collar 93 is moved axially.

As shown in Fig. 6, collar 93 is in a neutral position and both slots 107, 108 are out of contact with the projections. When collar 93 is shifted axially toward sprocket 89, ball 99 moves into depression 104, and slots 108 engage projections 110 so that sprocket 89, which is being driven from input shaft 79 by sprocket 85, rotates collar 93, and, in turn, output shaft 36. When collar 93 is moved axially in the opposite direction toward sprocket 88, ball 99 moves into depression 102, and slots 107 engage projections 109 on sprocket 88 so that output shaft 36 is then rotated through sprocket 88 which is, in turn, rotated by input shaft 79 through sprocket 84 and chain 90.

By this arrangement, two speeds are provided for output shaft 36. When collar 93 is moved axially to engage sprocket 89, output shaft 36 is rotated at a high speed, since sprocket 85 on input shaft 79 is large and sprocket 89 on output shaft 36 is small in diameter. When collar 93 is moved axially to engage sprocket 88, output shaft 36 is rotated at a low speed, since sprocket 84 on input shaft 79 is small and sprocket 88 on output shaft 36 is large in diameter.

The shifting of collar 93 axially is accomplished by a shifting fork 111, which is mounted on a shaft 112, the ends of which pass through openings in plates 75, 76 so that the fork is shiftable laterally in a direction parallel to the axis of output shaft 36. The front end of the fork 111 is arcuate and extends between flanges 95, 96 so that, when the fork is shifted transversely, collar 93 is also shifted axially (Fig. 8).

Shifting fork 111 is maintained in axially adjusted position by spring 113, one end of which engages a projection 114 on the rear end of the fork. Spring 113 has the other end thereof engaging a swivelled bracket 115 which is mounted on a cross bar 116. A shifting rod 117 is slidably mounted in plates 75, 76 and is fastened to shifting fork 111.

As shown in Fig. 2, shifting rod 117 is pivoted to one end of an L-shaped link 118 which, in turn, is pivoted to the housing at 119. An actuating rod 120 is fastened to the other end of link 118 and has a handle on the other end thereof (not shown) on the guiding handle 121 of the mower so that, by moving actuating rod 120 axially, link 118 is pivoted, causing shifting rod 117 to move transversely of transmission plates 75, 76 and, in turn, shift the shifting fork 111, causing the collar 93 to move axially on output shaft 36.

The operation of the lawn mower may be summarized as follows. When engine 15 is operating, rotary blade 13 is continuously rotated. In order to propel the lawn mower along the ground, transmission 20 is actuated by pushing or pulling actuating rod 120 which shifts shifting fork 111 laterally of the transmission housing through link 118 and shifting rod 117, bringing the slots of collar 93 into selective engagement with the projections on sprockets 88 or 89. When collar 93 engages sprocket 88, output shaft 36 is rotated at a low speed; and when collar 93 engages sprocket 89, output shaft 36 is rotated at a higher speed.

As shown in Fig. 3, rotation of output shaft 36 drives axle 17 through sprockets 21, 22, 23, 24 and endless chains 26, 27.

When it is desired to change the height of the grass cut, the transmission 20 is again actuated to bring collar 93 into a neutral position and arm 31 is manually grasped and moved transversely of the housing, bringing it out of engagement with notch 35 (Fig. 2). Arm 31 is then moved vertically to bring axle 17 into the desired position, as shown, for example, by the dotted lines in Fig. 3; arm 31 is then released, causing it to engage a newly selected notch 35. Each of the wheel height mechanisms on each end of the axles is similarly actuated. The lawn mower may again be propelled along the ground by engaging the transmission without any further adjustment of the driving connection between engine 15 and axle 17.

It will be noted that the driving connection between engine 15 and axle 17 is completely outside of housing 10, and there is no opening or protuberance within the confines of housing 10. Accordingly, the normal functioning of housing 10 to cut and discharge the grass cuttings is not interfered with. Since the major portion of the speed reduction occurs within the crankcase of the engine, the moving parts in the driving connection between engine 15 and axle 17 are operating at low speed, and therefore frequent lubrication is not required.

Referring to Fig. 3, when the wheel height adjusting mechanism is actuated to lower the wheels relative to the housing, the parts assume the position shown in the dotted lines. Link 39 pivots downwardly about the axis of output shaft 36 while drive arm 43 moves bodily downwardly and, in addition, pivots about the axis of axle 17 so that there is angular movement between link 39 and drive arm 43 about pin 41. The jack shaft 46 is thus moved bodily downwardly. The driving connection between sprockets 21 and 23 and sprockets 22 and 24 is maintained during the adjustment. Guard 51 rotates relative to hub 45 and accommodates to the new positions of drive arm 43 and link 39. Guard 63, being fixed to drive arm 43, moves therewith to the newly adjusted position. When moved into the dotted line position shown in Fig. 3, the wheels are adjusted relative to the housing so that the height of grass cut will be higher than when in the position shown by the solid lines. The mower may then be operated in the usual manner by engagement of the transmission.

We claim:

1. In a lawn mower, the combination comprising a housing, an axle mounted on said housing and having wheels mounted on each end thereof, means for vertically adjusting said axle relative to said housing, a power unit mounted on said housing, said power unit having an output shaft parallel to said vertically adjustable axle, a jack shaft, means for supporting said jack shaft for rotation and for arcuate movement about the axis of said axle, said jack shaft having its axis parallel to the axis of said axle, means including a first endless element extending between said output shaft and said jack shaft and a second endless element extending between said jack shaft and said axle for forming a driving connection between said power unit and said axle, said means for supporting said jack shaft comprising an arm on one end of which the axle is journalled, said jack shaft being rotatably mounted on said arm adjacent the other end thereof, and a link having one end thereof pivotally connected to said arm and the other end thereof pivotally connected to a fixed point relative to said housing, said point of pivotal connection of said link to said arm being spaced from the axis of said jack shaft, the pivotal point of the end of said link which is pivoted to a fixed point relative to the lawn mower housing lying along the axis of said output shaft.

2. In a lawn mower, the combination comprising a housing, an axle mounted on said housing and having wheels mounted on each end thereof, an arm pivoted to said axle at one end thereof, means for raising and lowering said arm and said axle as a unit while maintaining the pivotal connection between said arm and said axle, a power unit mounted on said housing, an output shaft on said housing driven by said power unit and having its axis parallel to the axis of said axle, a link pivoted at one end to the other end of said arm and at the other end to a fixed point adjacent the axis of said output shaft, a jack shaft mounted for rotation on one of said link and said arm adjacent the pivotal connection of said link and said arm to one another, and means including a first endless element extending between said output shaft and said jack shaft and a second endless element extending between said jack shaft and said axle for forming a driving connection between said power unit and said axle, whereby said driving connection is maintained between said output shaft and said axle during vertical adjustment of said axle relative to said housing, the fixed point to which the other end of said link is pivoted lying along the axis of said output shaft.

References Cited in the file of this patent

UNITED STATES PATENTS

| | | |
|---|---|---|
| 2,260,344 | Shaw | Oct. 28, 1941 |
| 2,674,896 | Arones | Apr. 13, 1954 |
| 2,688,224 | Hainke | Sept. 7, 1954 |
| 2,701,436 | Hartnett | Feb. 8, 1955 |
| 2,760,589 | Rudman | Aug. 28, 1956 |
| 2,786,541 | Conrad | Mar. 26, 1957 |